April 24, 1962         T. H. KERRY         3,031,155

HOUSINGS FOR GAS TURBINE ENGINES

Filed Aug. 25, 1960

Inventor
Thomas Henry Kerry
By
Cushman, Darby & Cushman
Attorneys

United States Patent Office 3,031,155
Patented Apr. 24, 1962

3,031,155
HOUSINGS FOR GAS TURBINE ENGINES
Thomas Henry Kerry, Derby, England, assignor to Rolls-Royce Limited, Derby, England
Filed Aug. 25, 1960, Ser. No. 51,973
Claims priority, application Great Britain Aug. 29, 1959
8 Claims. (Cl. 244—12)

This invention relates to means for supporting jet propulsion gas turbine engines in aircraft so that their longitudinal axes are disposed in a substantially vertical position whereby when the engine is in operation the exhaust gases are directed substantially vertically downwards to produce forces which enable the aircraft to take-off and land in a vertical direction.

It has also been proposed to provide aircraft which generate lift forces solely by the use of aerodynamic surfaces during forward flight or movement with additional engines which are arranged in the manner described above whereby the aerodynamic lift forces are augmented and the distance usually required for take-off reduced. Alternatively such an arrangement can be used to enable the aircraft to take-off over its usual distance, atlhough heavily laden.

However difficulty has been encountered in entraining air into the compressors of the vertically arranged engines during starting of the engine and even more particularly during forward movement of the aircraft.

According to this invention means for supporting one or more additional gas turbine engines with its or their longitudinal axes in a substantially vertical position comprises a housing or nacelle adapted to support the engine or engines which nacelle is provided with an extension whereby the housing or nacelle can be attached to an aircraft, the said extension being provided with one or more air inlets, which are arranged to face in a forward direction relative to the aircraft and which communicate directly with the, or each engine.

Each additional engine may be provided with a fan which is adjacent to and surrounding the engine exhaust nozzle which is actuated by a free turbine forming part of the engine, and in such a case the housing or nacelle is provided with additional air inlets, for the fans, the said additional inlets being separate from the air inlets for the compressors.

The extension on the housing or nacelle is preferably formed or attached thereto in such a manner that the housing or nacelle can be suspended from beneath the wing of an aircraft. The extension is preferably of aerofoil cross-section and is connected to a supporting member which supports the housing or nacelle on an aircraft.

Figure 1:
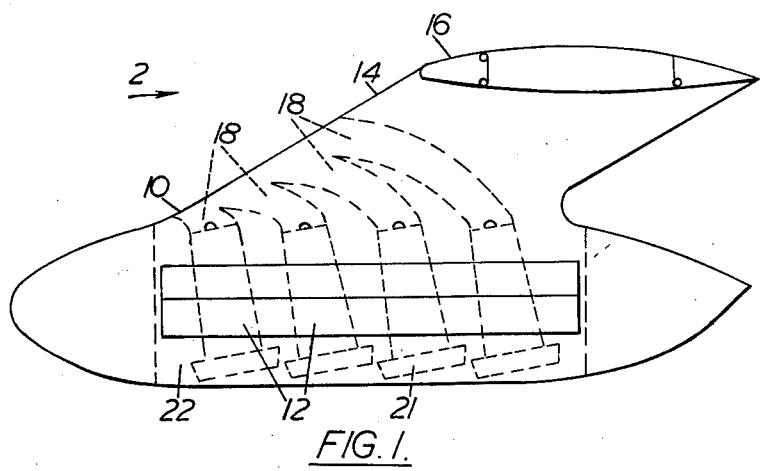
Figure 2:
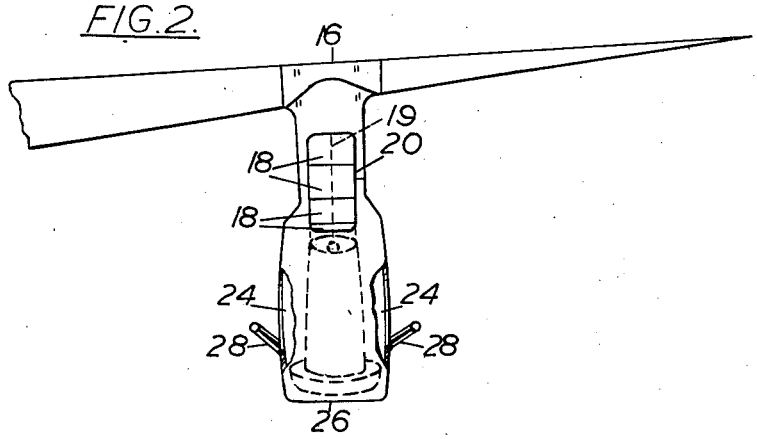

In order that the invention can be clearly understood, and readily carried into effect one construction of engine supporting means in accordance with the invention will now be particularly described, by way of example only, with reference to the accompanying drawings in which FIGURE 1 is a side view of the housing or nacelle, and
FIGURE 2 is a view in the direction of arrow II in FIGURE 1.

Referring to the drawings 10 indicates a housing or nacelle of substantially rectangular cross-section within which is supported four gas turbine engines 12.

Each engine 12 is supported on trunnions, not shown, and is arranged so that its longitudinal axis is disposed substantially vertically, whereby when the engine is operating the exhaust gases are directed substantially vertically downwards through a port or ports in the underside of the housing.

An extension 14, of aerofoil cross-section, is formed or mounted on the housing or nacelle 10 and projects vertically upwards therefrom and merges into a supporting member 16, which in this particular construction is of aerofoil cross-section and is designed to form part of the wing of an aircraft.

Four air inlet ducts 18 are formed in the extension 14, each duct 18 communicating directly at one end with the inlet to the compressor of one of the engines 12 whilst the other or inlet end of the ducts 18 communicate with an air intake 20 which is common to all of the said ducts.

The intake 20 is disposed in the extension 14 so that it will face in a forward direction when the housing or nacelle 10 is attached to an aircraft.

Closure means 19 are provided so that the intake 20 can be selectively covered and uncovered, the closure means being arranged to form a smooth continuation of the housing or nacelle when they are moved to a position to cover the intake 20.

Each engine in the arrangement described above is provided with a fan 21, which surrounds and is disposed adjacent to the outlet for the exhaust gases of the engine, the said fan being rotated by means of a free turbine forming part of the engine.

The fan is disposed within a housing 22 having an inlet 24 and an outlet 26 and air is admitted into the fan housing through doors 28 in the housing or nacelle.

The walls defining the ducts 18 are arranged so as to prevent air entering the compressors of the engines being entrained in to the fans.

As can be seen from FIGURE 2 of the drawings the support member 16 forms part of an aircraft wing, which aircraft not shown, is only normally provided with engines which provide a forward propulsive thrust.

When such an arrangement has been attached to an aircraft, forward movement of the aircraft entrains ram pressurized air into the intake 20 and thus into the ducts 18 to assist in starting the engines 12.

What we claim is:
1. In combination with a wing of an aircraft: a housing, said housing having an extension for attachment to the wing whereby the housing depends downwardly below the wing, at least one gas turbine jet engine mounted within said housing on a substantially vertical axis, said extension being provided with an unobstructed forwardly facing air inlet, duct means carried within said extension and extending from said unobstructed forwardly facing opening of said extension to the air intake of said engine, said housing having a downwardly facing opening beneath the jet engine for discharging the propulsive streams vertically downwardly.

2. The combination of claim 1 including closure means carried by said extension and selectively operable to cover and uncover said unobstructed forward facing opening.

3. The combination of claim 1 wherein said extension has an end portion adapted for attachment to the wing and having a cross-sectional configuration substantially similar to the wing.

4. The combination of claim 1 including means to detachably connect said extension to the wing.

5. The combination of claim 1 in which said engine includes a freely rotating turbine and a fan adjacent to and surrounding the discharge end of said engine, said fan being actuated by said freely rotating turbine.

6. The combination of claim 5 including air inlets provided on the side of said housing for supplying air to said fan.

7. A combination of claim 6 including selectively operable closure means carried by said housing for covering and uncovering the air inlets in said housing.

8. In combination with a wing of an aircraft: a housing, said housing having an extension for detachably attaching the same to the wing whereby the housing depends downwardly below the wing, a plurality of gas turbine jet engines each mounted on a substantially vertical axis within said housing, said jet engines being arranged one behind the other from the forward end of said housing to the rear of said housing, said extension being provided with an unobstructed forwardly facing air inlet, duct means carried within said extension and extending individually from said unobstructed forwardly facing opening of said extension to the respective air intakes of said engines, said housing having a downwardly facing opening beneath said jet engines for discharging the propulsive streams vertically downwardly therefrom, a freely rotating turbine forming part of each of said jet engines and a fan adjacent to and surrounding the discharge end of each of said engines, each fan being respectively rotated by the freely rotatable turbine of the respective engine, said housing having at least one opening in one of its side walls through which air is directed to the fan of each engine independently of the air supplied to the intake of the engines through the unobstructed forwardly facing opening of said extension.

References Cited in the file of this patent

UNITED STATES PATENTS

| | | |
|---|---|---|
| 2,734,698 | Straayer | Feb. 14, 1956 |
| 2,930,544 | Howell | Mar. 29, 1960 |